United States Patent [19]

Harada et al.

[11] Patent Number: 4,642,549

[45] Date of Patent: Feb. 10, 1987

[54] FERRORESONANT CONSTANT AC VOLTAGE REGULATOR

[75] Inventors: Kosuke Harada, Fukuoka; Katsuaki Murata, Kumamoto; Takazi Nakamizo, Fukuoka, all of Japan

[73] Assignee: Nishimu Electronics Industries Co., Ltd., Japan

[21] Appl. No.: 764,499

[22] Filed: Aug. 12, 1985

[30] Foreign Application Priority Data

Aug. 23, 1984 [JP] Japan ................................ 59-176441

[51] Int. Cl.[4] ................................................ H02J 3/18

[52] U.S. Cl. .................................... 323/210; 323/248; 323/249

[58] Field of Search ............... 323/248, 249, 254, 209, 323/210, 211, 329, 339

[56] References Cited

U.S. PATENT DOCUMENTS

| | | | |
|---|---|---|---|
| 2,246,177 | 6/1941 | Levoy, Jr. | 323/329 |
| 3,037,160 | 5/1962 | Manteuffel | 323/248 |
| 3,092,768 | 6/1963 | Kusko | 323/249 X |
| 4,339,705 | 7/1982 | Kelley | 323/210 |

OTHER PUBLICATIONS

Hunter, "Variable Flux-Reset Ferroresonant Voltage Regulator", IEEE Transactions on Magnetics, vol. MAG-7, No. 3, Sep. 1971, pp. 564-567.

*Primary Examiner*—Peter S. Wong

*Attorney, Agent, or Firm*—Kinney & Lange

[57] ABSTRACT

A constant voltage regulator involving a feedback loop by which frequency dependence may be eliminated and at the same time, hunting phenomenon in case of low load can be suppressed without inserting a dummy resistance or a reactor in its circuit, whereby high reliability may be compatible with low cost.

The constant voltage regulator comprises a linear reactor and a resonance capacitor connected in series to an input power source, and a variable reactor connected in parallel with said resonance capacitor and involves a feedback loop, a saturable reactor being used as said variable reactor, and current flowing through said saturable reactor being subjected to feedback control in response to load or output voltage.

15 Claims, 11 Drawing Figures

FERRORESONANT CONSTANT AC VOLTAGE REGULATOR

BACKGROUND OF THE INVENTION

1. Field of the Invention

This invention relates to a ferroresonant constant AC voltage regulator, and particularly to a ferroresonant constant AC voltage regulator for keeping always output voltage constant with respect to variation in AC input supply voltage and load current in which a saturable core is used for feedback loop.

2. Description of the Prior Art

It is important to maintain power sources in constant voltage in communication links, information processing, instrumentation and controlling devices. For this reason, various types of constant voltage regulators have heretofore been put to practical use and utilized.

FIG. 1 is a block diagram showing a ferroresonant constant AC voltage regulator which has heretofore been the most commonly used wherein a parallel resonance circuit composed of a resonance capacitor 3 and a saturable reactor 5 is connected in series to an input (commercial) power source 1 through a linear reactor 2. A load 10 is connected in parallel with said parallel resonance circuit.

Supposing that said parallel resonance circuit is resonated to a frequency of the input power source 1 at a certain voltage, electric currents Il and Ic flowing through the resonance capacitor 3 and the saturable reactor 5, respectively, are equal in amplitude and opposite in phase to each other so that their composite current becomes substantially zero, if the current higher harmonic component thereof is ignored.

When voltage of the input power source 1 varies, the composite current in said parallel resonance circuit varies so that the current passing through the linear reactor 2 and voltage drop across the same vary also, and it leads to compensating effect. Thus the voltage applied to said parallel resonance circuit, i.e., the applied voltage to the load 10 is automatically maintained at a substantially constant value.

The above described constant AC voltage regulator is a ferroresonant type device wherein saturation phenomenon of magnetic core is utilized as is well known. This type of device has widely been put to practical use as power source and the like devices, because they have many favorable characteristic properties such that parts employed are solid and number of the parts is few, besides the devices are tolerant of distortion due to thermal expansion and jamming electromagnetic field, and moreover these devices have high durability and are inexpensive.

Recently, there has been proposed such constant voltage power source device in which a linear reactor is utilized in place of using saturation phenomenon of a magnetic core as shown in FIG. 2 wherein like or corresponding parts are shown by like reference numerals throughout FIG. 1.

A series circuit composed of a linear reactor 4 and a switching circuit 7 (for example, triode AC switch, thyristor or the like) is connected in parallel to a resonance capacitor 3. An output voltage detector 9 is connected in parallel with a load 10 to create on-off control signals decided in response to output (load) voltage.

In other words, firing angle of the switching circuit 7 is controlled in response to output signals of the output voltage detector 9, whereby equivalent reactance of the linear reactor 4 is variably controlled.

More specifically, when load voltage is higher than a target value, the control therefor is made in such a manner that the firing angle is advanced to increase the current flowing through the linear reactor 4, whereby the load voltage is decreased, whilst such control is reversed in the case where the load voltage is lower than the target value.

Unlike the regulator of FIG. 1, the constant voltage power source device in FIG. 2 has no frequency dependence, little distortion of waveform, and high efficiency. For this reason, the latter device has recently increased in practical use with rapidity.

Since the circuit shown in FIG. 1 utilizes a parallel resonance circuit as mentioned above, there arise such problems that the output voltage depends upon frequency, and distortion increases or efficiency decreases with the increase of exciting current accompanied with saturation of the magnetic core and the like.

Furthermore the circuit of FIG. 2 involves such problems that operational delay of the control circuit occurs in case of, particularly, low load, and since the operating point is a sensitive point, hunting phenomena generate easily so that it is difficult to ensure stable operation.

In order to improve unstable operation in case of low load, it has been proposed to connect a dummy resistance 11 in parallel to the load 10 in addition to the circuit shown in FIG. 2 in only the case of low load as illustrated in FIG. 3.

In FIG. 3, an additional output voltage detector 9A produces a control signal under low load condition to cause an additional switching circuit 7A to conduct. As a result, the same state as that where load current increases is obtained, so that the aforementioned disadvantages in FIG. 2 may be eliminated.

Furthermore, as shown in FIG. 4, it has been also proposed to use a second linear reactor 4A in place of the dummy resistance 11.

In the constant voltage regulator of FIG. 3, since electric power is consumed by the dummy resistance 11, there are such problems that its efficiency decreases, and in addition transient variation occurs at the time of connecting and disconnecting the dummy resistance 11. While there is no problem as to electric power consumption by means of the dummy resistance 11 in the regulator of FIG. 4, there is such a problem that transient phenomenon appears at the time of connecting and disconnecting the linear reactor 4A as in the cases of FIGS. 2 and 3.

In addition to the above, since a control circuit for connecting and disconnecting the dummy resistance 11 or the second linear reactor 4A is separately provided in the cases of FIGS. 3 and 4, there are such disadvantages in that construction of the control circuit becomes complicated, and it results in increase in cost as well as decrease in reliability.

SUMMARY OF THE INVENTION

It is an object of the present invention to provide a constant voltage regulator involving a feedback loop by which frequency dependence may be eliminated and at the same time, hunting phenomenon in case of low load can be suppressed without inserting a dummy resistance or a reactor in its circuit unlike conventional cases, whereby high reliability may be compatible with low cost.

In order to attain the aforesaid object, the present invention provides a constant voltage regulating circuit comprising a linear reactor and a resonance capacitor connected in series to an input power source, and a variable reactor connected in parallel with said resonance capacitor and involving a feedback loop, a saturable reactor being used as said variable reactor, and current flowing through said saturable reactor being subjected to feedback control in response to load or output voltage.

DETAILED DESCRIPTION OF THE PREFERRED EMBODIMENTS

Figure 5:
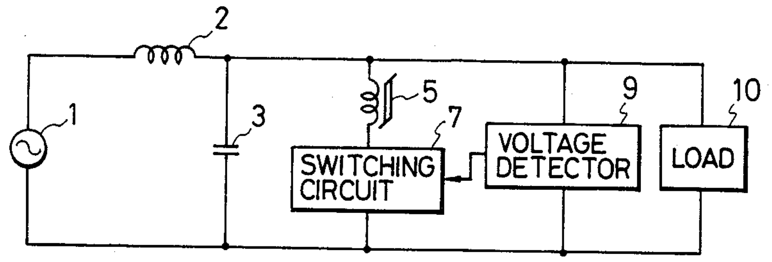
FIG. 5 is a block diagram illustrating the first embodiment of the present invention.

The present invention will be described in detail hereinbelow by referring to the accompanying drawings wherein FIG. 5 is a block diagram showing the construction in accordance with the first embodiment of the present invention in which like reference characters designate like or corresponding parts throughout FIG. 2. As is apparent in comparison with a conventional example of FIG. 2, the present embodiment corresponds to one in which the linear reactor 4 is replaced by a saturable reactor 5.

In the case when the voltage of an input power source 1 increases or load current decreases to raise output voltage, a voltage detector 9 detects the increase in voltage to output signals for effecting on-off control of a switching element 7.

More specifically, the voltage detector 9 compares the voltage detected as described above with reference or target value and controls firing angle of the switching element 7 connected in series to the saturable reactor 5 in response to the difference obtained by said comparison to increase the current flowing through the saturable reactor 5. As a result of increasing the reactive current (lagging current) flowing through a linear reactor 2 as described above, the output or load voltage decreases.

On the contrary, when the voltage of the input power source drops or the output voltage at a load 10 decreases because of increase in load current, the voltage detector 9 detects a value of the voltage drop to supply control signals which function to decrease the current flowing through the saturable reactor 5 to the switching element 7.

In accordance with the manner as described above, the reactive current (lagging current) flowing through the linear reactor 2 decreases. As a result, a ratio of capacitive current increases relatively to raise the output voltage.

Furthermore, since a saturable reactor is used as the variable reactor in the present embodiment, when the current flowing through the saturable reactor 5 is increased in case of low load, said saturable reactor 5 is saturated.

Hence it is possible that equivalent reactance of the saturable reactor 5 is made to be lower than that in the case where linear reactor is used so that the current flowing through the saturable reactor 5 in case of low load is made to be higher and said current may continuously be controlled.

In these circumstances, hunting phenomena may be suppressed and at the same time, good constant-voltage characteristic as well as output voltage waveform which equals a substantially sinusoidal wave can be obtained.

Figure 6:
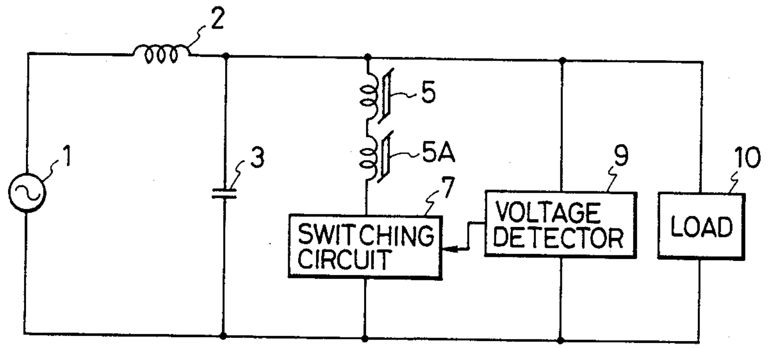
FIGS. 6 and 7 are block diagrams illustrating the second and third embodiments of the present invention, respectively.

FIG. 6 is a block diagram illustrating the second embodiment of the present invention in which like reference characters designate like or corresponding parts throughout FIG. 5 wherein a saturable reactor 5A is connected in series to a saturable reactor 5.

In the second embodiment, as is clear from the above, a plurality (two in FIG. 6) of series connected saturable reactors having different saturation characteristic are used instead of one saturable reactor 5 in the first embodiment illustrated in FIG. 5.

According to the second embodiment, since total saturation characteristic (derived from a plurality of series connected saturable reactors) corresponding to saturation characteristic of the saturable reactor 5 in FIG. 5 may suitably be selected, constant voltage can be more smoothly controlled over a range extending from low to high load.

Figure 7:
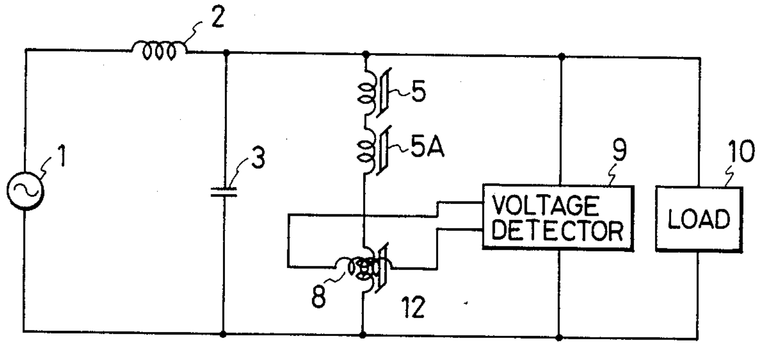

FIG. 7 is a block diagram illustrating the third embodiment of the present invention wherein like reference characters designate like or corresponding parts throughout FIG. 6 in which a saturable reactor 12 with a control winding 8 is utilized in place of the switching circuit 7 as a means for controlling the current flowing through serially combined reactances of saturable reactors 5 and 5A.

The saturable reactor 12 for controlling current is connected in series to said saturable reactors 5 and 5A, and the control winding 8 is wound around an iron core (magnetic circuit) of the saturable reactor 12. When feedback current from a voltage detector 9 is passed through said control winding 8, inductance of the saturable reactor 12 is variably controlled so that the current flowing through the saturable reactors 5 and 5A can be regulated.

In accordance with the third embodiment, since a switching element such as triode AC switch, thyristor or the like is not required, reliability is further improved in the feedback loop system.

Figure 8:
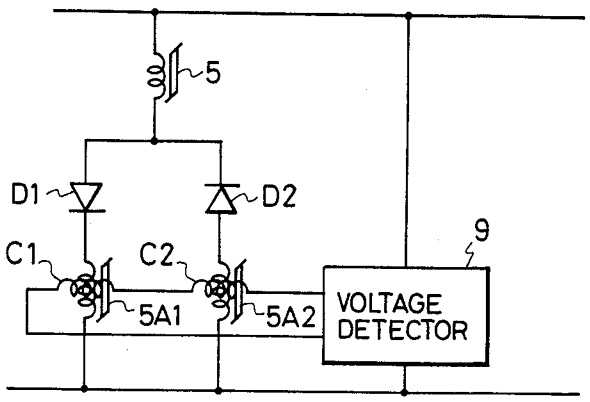
FIG. 8 is a circuit diagram illustrating a modification of the circuit part including the saturable reactors shown in FIG. 7.

FIG. 8 is a circuit diagram illustrating a modification of the circuit part including the saturable reactors 5 and 5A shown in FIG. 7, wherein like reference characters designate like or corresponding parts throughout FIG. 7.

In FIG. 8, the saturable reactor 5A of FIG. 7 is divided into saturable reactors 5A1 and 5A2 to which diodes D1 and D2 are connected in series so as to flow every half-wave components of alternating current (with a different phase by $\pi$), respectively. The saturable reactors 5A1 and 5A2 are provided respectively with control windings C1 and C2, and these control windings C1 and C2 are connected in series to each other.

Since feedback current from an output voltage detector 9 is supplied to said control windings C1 and C2, it is apparent that the current flowing through the saturable reactors 5 and 5A in response to said feedback current as well as the saturated condition thereof are controlled. This construction has such an advantage that the control sensitivity can be improved as compared with that of the circuit construction of FIG. 7.

Figure 9:
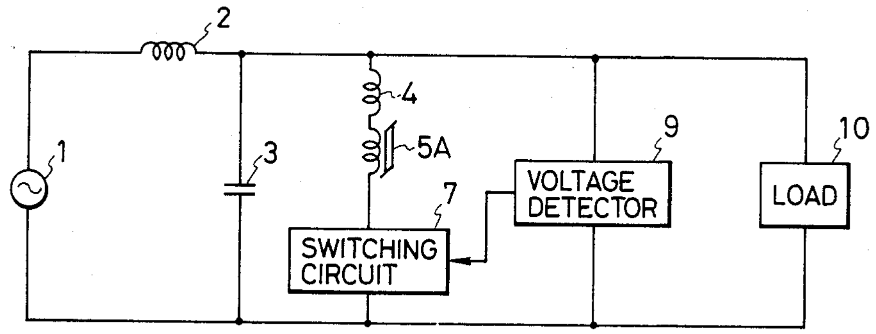
FIG. 9 is a circuit diagram illustrating the fourth embodiment of the present invention.

FIG. 9 is a circuit diagram illustrating the fourth embodiment of the present invention being the same with the circuit of FIG. 6 except that the saturable reactor 5 is replaced by a linear reactor 4. Because of such construction, it is apparent to obtain the substantially same functions and advantages with those of the regulator shown in FIG. 6.

Figure 10:
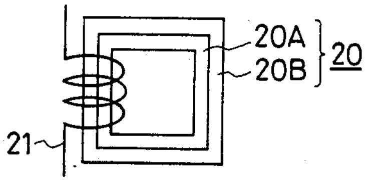
FIG. 10 is a schematic side view showing an example of specific construction of saturable reactor suitably used in the present invention.

FIG. 10 is a schematic side view showing an example of specific construction of a saturable reactor suitably used for the present invention wherein an iron core 20 is composed of several types (two types in FIG. 10) of parallel magnetic paths 20A and 20B having different magnetic permeabilities $\mu$, and to said iron core 20 winding 21 is applied. In this case, the parallel magnetic paths 20A and 20B are preferably selected in respect of their profiles in section, dimensions or the like in such that these parallel magnetic paths are saturated in order of magnitude of magnetic permeability $\mu$ with increase of the current flowing through the winding 21. By such construction, it is obvious that equivalent functions and advantages to those of the circuit in FIG. 6 can be realized.

Figure 11:
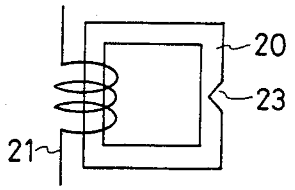
FIG. 11 is a schematic side view showing another example of specific construction of saturable reactor suitably used in the present invention.

FIG. 11 is a schematic side view showing another example of specific construction of saturable reactor suitably used for the present invention wherein a wedge-shaped notch 23 is defined on an iron core 20 by cutting off the same thereby reducing the sectional area of such magnetic circuit. When the current flowing through a winding 21 increases up to a certain value, the part of said notch 23 in the iron core 20 begins to saturate and such saturated part expands with further increase of the current. Thus equivalent functions and advantages to those of the circuit shown in FIG. 6 can be realized.

As is apparent from the above description, the present invention has attained the following advantages.

Figure 1:
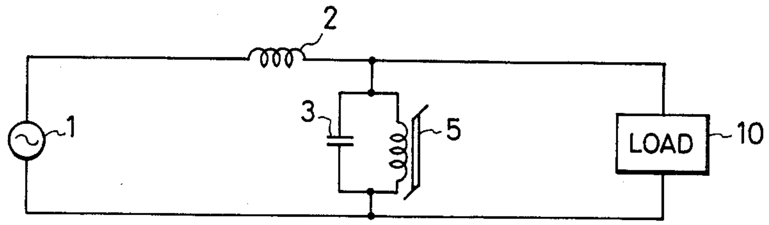
FIG. 1 PRIOR ART
FIGS. 1, 2, 3 and 4 are block diagrams each showing a construction of a conventional constant voltage regulator wherein ferroresonance is utilized.

(1) When compared with the conventional regulator shown in FIG. 1, since no frequency dependence is observed in constant-voltage characteristic and rapid increase of exciting current due to saturation of magnetic core can be suppressed in the regurator of this invention, waveform distortion and heat generation or the like accompanied therewith decrease so that high efficiency can be realized.

Figure 2:
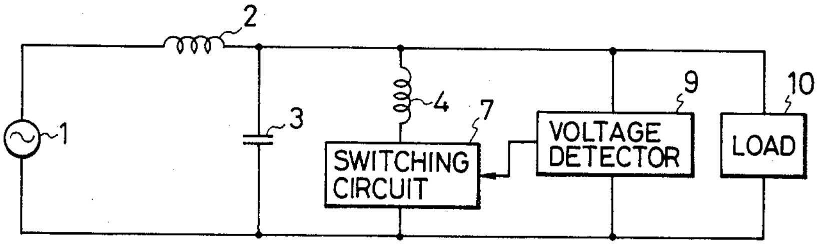
FIG. 2 PRIOR ART

(2) Comparing the conventional regulator involving the feedback loop of FIG. 2, control characteristic in low load is improved in the regulator according to the present invention so that there is no fear of hunting.

Figure 3:
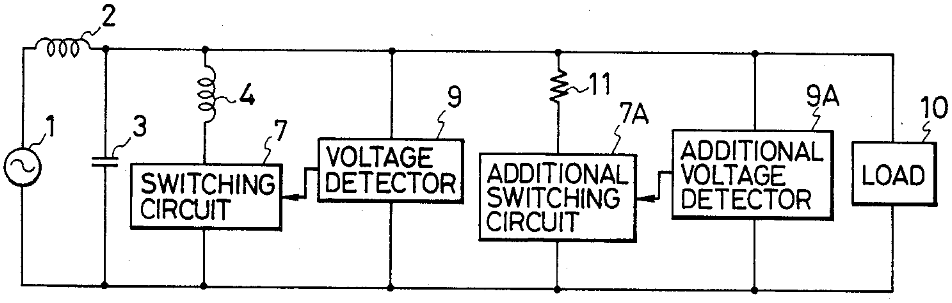
FIG. 3 PRIOR ART
Figure 4:
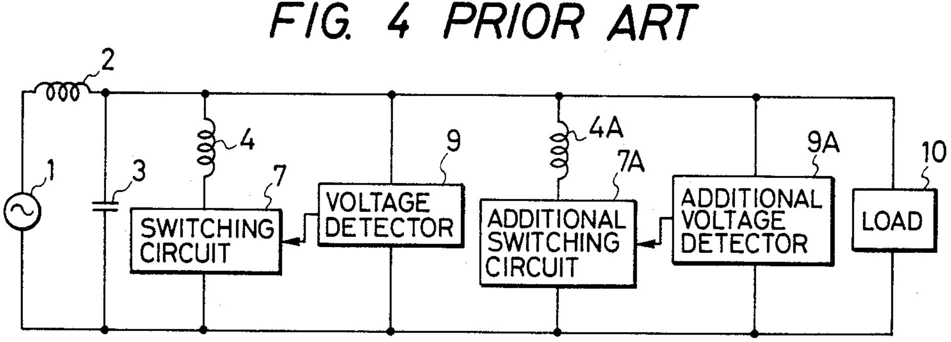
FIG. 4 PRIOR ART

(3) In comparison with the conventional regulators shown in FIGS. 3 and 4, the control circuit is simple so that dummy resistance or dummy inductance become unnecessary in the regulator of this invention. Thus, in accordance with the constant voltage regulator of the present invention, electric power consumption is small so that it is highly efficient, besides it is expected to realize higher reliability and remarkable reduction in the cost.

What is claimed is:

1. A ferroresonant constant AC voltage regular comprising:

a linear reactor and a capacitor connected in series to an AC power source, a series connected circuit comprising a saturable reactor means and a switching circuit connected in parallel to said capacitor, a voltage detector for detecting an output voltage appearing across asid capacitor, and means for controlling on-off state of said switching circuit in response to the output voltage detected by said voltage detector, and said regulator being controlled in such that the higher said detected output voltage is, the longer the time during which said switching circuit is in its on-state, and the larger the average lagging current which flows through said saturable reactor means.

2. A ferroresonant constant AC voltage regulator as claimed in claim 1 wherein said saturable reactor means comprises a plurality of saturable reactors having different saturation characteristics and connected in series to each other.

3. A ferroresonant constant AC voltage regulator as claimed in claim 1 wherein said saturable reactor means comprises a saturable reactor and a linear reactor connected in series to each other.

4. A ferroresonant constant AC voltage regulator as claimed in claim 1 wherein said saturable reactor means comprises an iron core consisting of a plurality of parallel magnetic paths having different saturation characteristics and a winding wound around said iron core.

5. A ferroresonant constant AC voltage regulator as claimed in claim 2 wherein said saturable reactor means comprises an iron core consisting of a plurality of parallel magnetic paths having different saturation characteristics and a winding wound around said iron core.

6. A ferroresonant constant AC voltage regulator as claimed in claim 3 wherein said saturable reactor means comprises an iron core consisting of a plurality of parallel magnetic paths having different saturation characteristics and a winding wound around said iron core.

7. A ferroresonant constant AC voltage regulator as claimed in claim 2 wherein said saturable reactor means comprises an iron core involving at least one small notched portion and a winding wound around said iron core.

8. A ferroresonant constant AC voltage regulator as claimed in claim 3 wherein said saturable reactor means comprises an iron core involving at least one small notched portion and a winding wound around said iron core.

9. A ferroresonant constant AC voltage regulator comprising:

a linear reactor and a capacitor connected in series to an AC power source, a plurality of saturable reactors connected in series to each other, and connected in parallel to said capacitor, a voltage detector for detecting an output voltage appearing across said capacitor, a control winding wound around at least one but not all of said saturable reactors, and means for controlling the current flowing through each said control winding to switch each saturable reactor without a control winding between its saturated and non-saturated states in response to the output voltage detected by said output voltage detector, and said regulator being controlled in such that that the higher said detected output voltage is, the longer the time during which each saturable reactor without a control winding is in its saturated state, and the larger the average lagging current which flows through each said saturable reactor.

10. A ferroresonant constant AC voltage regulator as claimed in claim 9 wherein said one saturable reactor provided with said control winding comprises two subordinate saturable reactors which are connected in parallel to each other and in series with the other saturable reactors of the plurality as as to form a pair, and half-wave components of an alternating current with phase differences of $\pi$ are conducted to said subordinate saturable reactors, respectively.

11. A ferroresonant constant AC voltage regulator as claimed in claim 9 wherein said plurality of saturable reactors have different saturation characteristics.

12. A ferroresonant constant AC voltage regulator as claimed in claim 9 wherein said saturable reactors comprise an iron core consisting of a plurality of parallel magnetic paths having different saturation characteristics and a winding wound around said iron core.

13. A ferroresonant constant AC voltage regulator as claimed in claim 10 wherein said saturable reactors comprise an iron core consisting of a plurality of parallel magnetic paths having different saturation characteristics and a winding wound around said iron core.

14. A ferroresonant constant AC voltage regulator as claimed in claim 9 wherein said saturable reactors comprise an iron core involving at least one small notched portion and a winding wound around said iron core.

15. A ferroresonant constant AC voltage regulator as claimed in claim 10 wherein said saturable reactors comprise an iron core involving at least one small notched portion and a winding wound around said iron core.

* * * * *